United States Patent
Baur et al.

(10) Patent No.: US 6,288,179 B1
(45) Date of Patent: Sep. 11, 2001

(54) BATTERED AND BATTERED/BREADED FOODS WITH ENHANCED TEXTURAL CHARACTERISTICS

(75) Inventors: Joachim Baur, Newcastle; Kenneth S. Darley, Ajax, both of (CA); Joseph J. Janda, Midlothian, IL (US); James R. Martin, Homewood, IL (US); Donald B. Bernacchi, Chicago, IL (US); Irene Greener Donhowe, Palos Hills, IL (US)

(73) Assignee: Griffith Laboratories International, Inc., Alsip, IL (US)

( * ) Notice: Subject to any disclaimer, the term of this patent is extended or adjusted under 35 U.S.C. 154(b) by 0 days.

(21) Appl. No.: 09/559,009

(22) Filed: Apr. 24, 2000

Related U.S. Application Data

(63) Continuation of application No. 08/587,136, filed on Jan. 16, 1996, now abandoned, which is a continuation of application No. 08/143,876, filed on Oct. 28, 1993, now abandoned.

(51) Int. Cl.$^7$ ........................................ A21D 10/04
(52) U.S. Cl. ................. 526/89; 426/94; 426/289; 426/293; 426/296; 426/302; 426/303
(58) Field of Search ................. 426/89, 94, 289, 426/5, 49, 302, 293, 296, 303, 496

(56) References Cited

U.S. PATENT DOCUMENTS

| | | | |
|---|---|---|---|
| 3,449,132 | * | 6/1969 | Luksas ................................. 426/94 |
| 5,009,903 | * | 4/1991 | DeFigueiredo et al. ............ 426/243 |

* cited by examiner

*Primary Examiner*—Lien Tran
(74) *Attorney, Agent, or Firm*—Laff, Whitesel & Saret, Ltd.

(57) ABSTRACT

A food product having the crisp texture, golden brown appearance and fresh fried taste of conventionally-fried foods, comprising a food substrate coated with a cereal-based batter containing sodium caseinate and no egg albumen in which the batter has a solids level of at least 30 percent by weight and provides at least about 0.2 percent by weight of sodium caseinate.

19 Claims, 2 Drawing Sheets

BATTERED AND BATTERED/BREADED FOODS WITH ENHANCED TEXTURAL CHARACTERISTICS

This application is a continuation of U.S. patent application Ser. No. 08/587,136, filed Jan. 16, 1996 now abandoned which in turn is a continuation of U.S. patent application Ser. No. 08/143,876, filed Oct. 28, 1993 now abandoned.

BACKGROUND OF THE INVENTION

Consumers develop preferences for particular types of food based upon texture, (i.e., the tactile experience caused by the food in their mouths in conjunction with the food's distinct visual, physical and chemical characteristics). For example, fried, battered and battered/breaded foods are extremely popular because so many people have developed a liking for the crisp texture, golden brown appearance, and fresh fried taste of such foods.

Unfortunately, once prepared, the crisp texture, golden brown appearance, and fresh fried taste of conventionally fried foods are difficult to maintain. This problem is particularly acute in situations such as those encountered in fast food restaurants, where battered and battered/breaded foods are fried up and then held for a period of time before they are purchased and consumed. This problem is also of concern with respect to frozen and refrigerated battered/breaded foods which are purchased by consumers for final preparation in the home.

Therefore, it would be highly desirable to develop fried battered and battered/breaded foods which have the crisp texture, golden brown appearance, and fresh fried taste of conventionally fried foods, yet can be stored after preparation without losing these desirable organoleptic properties.

SUMMARY OF THE INVENTION

The present invention is directed to battered and battered/breaded foods and to methods of their preparation. More particularly, the present invention is directed to battered and battered/breaded foods with a crisp texture, a golden brown appearance and a fresh fried taste which retain these desirable characteristics even if stored for a period of time after they are fully prepared but before they are consumed. The present invention is also directed to a method for making such unusually stable battered and battered/breaded foods.

Accordingly, the product of the present invention comprises a food substrate and a coating of cereal-based batter containing a particular non-gelling milk protein, sodium caseinate. No egg white (albumin) or whey should be present since egg white and whey, which are gelling (or heat-coagulateable) proteins, reduce or prevent the textural enhancement achieved with sodium caseinate. The batter should have a total solids level of at least 30 percent by weight and pick up of the batter should be sufficient to provide at least about 0.2 percent by weight of sodium caseinate, based on the weight of the product.

The food product may include a breading as either an overcoat or an undercoat. Additionally, where necessary to eliminate uncooked interface, the batter will include at least about 2 percent by weight of added edible fat.

DETAILED DESCRIPTION

Food Substrates

Figure 1:
FIG. 1 is a close-up photograph of the caseinate-containing batter-coated chicken pieces described in Example 3 illustrating the crisp, crunchy, fracturable coating and golden brown appearance achieved in that product.

The food substrates which may be used in the practice of this invention include meat, poultry, seafood, cheese, vegetables, fruit, cereal-based products, and nuts. Examples of cereal-based products include pizza doughs, biscuit doughs, grain-based snacks, veggie burgers, and breakfast cereals.

Batters and Breadings

Any conventional cereal-based batter can be used in the practice of this invention including tempura batters and batters typically used with undercoatings or overcoatings of flour or breadings. The batters will be applied to the substrates by conventional techniques such as by submerging the substrate in the batter, passing the substrate under a batter waterfall or spraying the batter onto the substrate.

A typical tempura batter would compromise the following ingredients, expressed in percentage by weight of the dry mixture:

| Ingredient | Range of Concentration | Preferred Concentration |
|---|---|---|
| wheat flour | 15–76% | 40% |
| yellow corn flour modified and/or unmodified food starch | 0–60% | 40% |
| | 0–75% | 10% |
| salt | 0–15% | 3.5% |
| sugars | 0–20% | 4.5% |
| leavening | .25–.04% | 2% |

Tempura batters like those described above may be prepared by mixing the dry components and then combining with water in a ratio by weight of water to dry ingredients of from about 2:1 to 1:1.25 and preferably about 1.125:1.

The present invention may also be used with batters intended for use with undercoatings and/or overcoatings of flour and breadings. A typical such batter will compromise the following ingredients, expressed in percentage by weight of the dry mixture.

| Ingredient | Range of Concentration | Preferred Concentration |
|---|---|---|
| yellow corn flour | 0–20% | 15% |
| modified and/or unmodified food starch | 10–90% | 70% |
| wheat flour | 0–20% | 10% |
| salt | 2–10% | 3% |
| sugars | 0–05% | 1.75% |
| leavening | 0–01% | 0.25% |

Again, these batters may be prepared by mixing the dry ingredients and then combining with water. The ratio by weight of water to dry ingredients may range from about 2:1 to 1:1 and preferably will be about 1.25:1.

The breading used with the above batter may be chosen from the group comprising unhydrated, raw, fully-cooked or partially-cooked cereals such as wheat flour, rice flour, corn flour, bread crumbs or corn flakes. The breading, which preferably is ground to at least 100 percent through a U.S. No. 3 sieve, will be applied by conventional procedures (i.e., dusting or tumbling), either before or after application of the batter. Application of the breading after the batter is preferred when the greatest texture is desired in the final product.

In all cases, the final batter, before application, must have a total solids level of at least about 30 percent by weight, preferably will have a total solids level of from about 30 to 60 percent by weight, and most preferably will contain at least about 45 percent by weight total solids.

The Texturizing Agents

The batter will include a texturizing agent in the form of sodium caseinate and in certain applications as explained below, added edible fat above and beyond the fat already inherently present in the dry ingredients or conventionally added as a processing aid to insure uniform distribution of the ingredients (which together typically amount to up to about 0.25 percent by weight of the hydrated batter). When added fat is used, the two components must be added separately to the mixture and, as also explained below, in a preferred embodiment the fat will be creamed onto the dry batter ingredients. The level of the sodium caseinate in the final hydrated batter must be in the range of from about 0.6 to 8.0 percent by weight, preferably will be at a level of about 1.0 to 6.0 percent by weight and most preferably will be at level of about 3 percent by weight. Additionally, the pick-up of the batter on the substrate must be sufficient to provide at least about 0.2 percent by weight of sodium caseinate based on the weight of the coated product. Preferably, the pick-up will be about 0.2 to 3.0 percent by weight and most preferably it will be about 1 percent by weight. Gelling (or heat-coagulateable) proteins, such as albumin and whey, must be absent from the batter in order to obtain the full improvements in textural characteristics achieved by the invention.

Additionally, in applications where a gelatinous uncooked interface is otherwise formed, the texturizing agent should include added edible fat. Typical useful edible fats include vegetable oil, hydrogenated vegetable oil, plant oils and animal fats. The preferred edible fat is hydrogenated soybean oil.

The combination of the texturizing agent in the absence of gelling proteins and added fat will reduce or eliminate the uncooked interface which tends to form when there is a high pick-up of the batter (more than about 25 percent by weight based on the coated product before processing) and when a high moisture substrate (more than about 60 percent moisture by weight of the substrate) is used.

The level of added edible fat will be at least about 2 percent by weight of the final hydrated batter, which otherwise typically would contain less than about 1% fat. Preferably, the added edible fat will be at a level of about 2 to 4 percent by weight and most preferably it will be at a level of about 3 percent by weight.

Although not required, it is preferred that some or all of the added fat be "creamed" onto some or all of the dry ingredients before they are hydrated to make the batter. This "creaming" step makes the dry ingredients somewhat hydrophobic so that there is reduced swelling and therefore reduced viscosity in the final batter, at a given solids level. As a result, higher solids levels may be used without making the batter too thick to handle. Also, the reduced moisture at a given solids level results in a reduction in the formation of uncooked interface in the finished product. The "creaming" step, for example, may be carried out by high shear blending of some or all of the dry ingredients with the fat in, e.g., a fluidized bed blender or a ribbon blender.

Preparation of Foods with Enhanced Crispiness

Battered and battered/breaded foods with enhanced crispness may be prepared for eating in accordance with the present invention by:

1) Batter-coating and optionally breading the substrate, parfrying, optionally freezing or refrigerating the coated/parfried product until needed, and then completely cooking as described below;
2) Batter-coating and optionally breading the substrate, freezing or refrigerating the coated product and, without holding in a refrigerator or freezer, completely cooking (as described below); or
3) Batter-coating and optionally breading the substrate, optionally parfrying, fully cooking, and freezing or refrigerating the coated product and then reheating as described below.

If the substrate is batter coated but not breaded, it must be parfried or full fried following application of the batter.

When parfrying is employed, it should be carried out at a temperature in the range of about 180° C. to 210° C. for about 15 to 60 seconds and preferably at a temperature of about 200° C. for about 30 seconds. The resulting product then may be stored under refrigeration at about 3° C. to 7° C. or frozen at about 0° C. to 40° C. When full cooking is employed, it should be carried out at a temperature of about 160°–230° C. and preferably at about 175° C. for about 2 to 12 minutes.

When it is desired to finalize the parfried product for eating, it will be cooked to completion by conventional means such as by baking in a conventional oven, a convection oven or a microwave oven, by steaming, by deep-fat frying, or sautéing.

Coated substrates which are not parfried but rather are refrigerated or frozen after coating will require at least partial frying in order to obtain the desired fried appearance in the final product. Thus, such batter-coated substrates may be taken from the refrigerator or freezer and then fully cooked by deep-fat frying or sautéing. When it is desired to prepare the previously fully cooked coated substrates, they need only be heated up to eating temperature by placing in an oven at about 175° C. to 210° C. for 10 to 20 minutes.

Products prepared in accordance with this invention are particularly well adapted for holding under a heat lamp or in a warming cabinet after preparation. In other words, once products prepared in accordance with this invention are fully cooked, they may be held for from 15 minutes to one hour or more under a heat lamp, in a warming cabinet or in some other heat-holding apparatus without significant deterioration of the crisp texture, golden brown appearance and fresh fried taste of the product.

EXAMPLES

The following examples are intended to be illustrative of the present invention and to teach one of ordinary skill in the art how to make and use the invention. These examples are not intended to limit the invention or its protection in any way.

Example 1

In this example, the effectiveness of various different proteins on the crispness of an ovenized batter coating was examined.

The proteins evaluated included sodium caseinate, lactalbumin, milk protein isolate (total milk protein-mixture of whey protein and caseinates), whey protein concentrate, and soy protein isolate. Protein at a 1.5% by weight level based on the final hydrated batter was dry blended with the other batter components (wheat flour, hydrogenated vegetable oil, leavening, sugar, salt, and corn flour) and mixed at a 1:1 ratio by weight with cold water. The shortening constituted about 2.14% by weight of the final hydrated batter. Pollack fish portions (about 1.3 oz.) were dipped into the batter (pick-up about 50% by weight of the coated product before processing) and parfried for 30 seconds at about 200° C. The batter-coated fish portions were then frozen for about 18 hours.

The frozen, battered fish portions were then reconstituted by cooking in a regular household oven for 30 minutes at about 205° C. The reconstituted portions were examined and it was found that those coated with batters made with sodium caseinate exhibited a unique, delicate crispiness in comparison to the control, which contained no added protein. The milk protein isolate produced a significantly lesser texture enhancement. Finally, the whey and soy protein-containing batters produced the same soggy texture seen in the control batter-coated products.

Example 2

In this example the effectiveness of batters containing texturizing agents comprising sodium caseinate/fat combinations, as well as caseinate-free and fat-free batters were examined and compared.

The substrate used in each case was frozen pollack fish weighing about 1.3 oz. The batters set out in Table I were used in the tests.

TABLE I

| SAMPLE | STANDARD BATTER MIX | SODIUM CASEINATE (1.5% by weight of hydrated batter) | FAT (2% by weight of hydrated batter) | FAT (creamed on flour) |
|---|---|---|---|---|
| A | x | | | |
| B | x | x | | |
| C | x | x | x | No |
| D | x | x | x | Yes |
| E | x | | x | Yes |
| F | x | | x | No |

The fish portions were coated with the batter by dipping and then parfrying in a deep fat fryer for 30 seconds at about 200° C. After the parfrying step, the pick-up of batter for each sample was determined. The batter-coated products were then stored in a freezer at about −40° C. for three days after which they were reheated in an oven at about 220° C. for 15 minutes. The finished products were evaluated for texture, the presence or absence of interface, and color. The results are set out in Table II.

TABLE II

| SAMPLE | % PICK UP | TEXTURE | COLOR | INTERFACE |
|---|---|---|---|---|
| A | 50.89% | Soggy | Pale Yellow | Substantial |
| B | 46.1% | Very slight crispiness | Golden Brown | Same as control |
| C | 45.52% | Crisp | Golden Brown | Minimum |
| D | 47.81% | Crisp | Golden Brown | Minimum |
| E | 45.71% | Soggy | Pale Yellow | Substantial |
| F | 52.4% | Soggy | Pale Yellow | Slightly better than Test E |

The data set out in Table II demonstrates the following:

1. While the use of sodium caseinate improved the texture of the product after oven reconstitution, in this case there was no reduction of uncooked interface.

2. The use of a texturizing agent comprising a combination of sodium caseinate and fat (either creamed or non-creamed to the flour) substantially improved the texture of the finished product and minimized the amount of uncooked interface.

3. Batters without fat or sodium caseinate showed significantly inferior texture and undesirable interface, as compared to those containing the caseinate/fat texturizing agent.

Example 3

In this example, two sets of batter-coated product were prepared by dipping boneless chicken pieces in two batters, the first comprising, on a dry basis, 14% sodium caseinate and 86% wheat starch and the second comprising 100% wheat starch. The dry mixes were combined with water on a weight basis of 1.5 parts water to 1 part dry mix. Batter pick-up on the chicken pieces was about 20% by weight based on the coated pieces before processing. Once coated, the chicken pieces were lightly coated with flour, parfried at 200° C. for about 30 seconds, frozen, and then reheated in a deep fat fryer at about 180° C. for four minutes.

Figure 2:
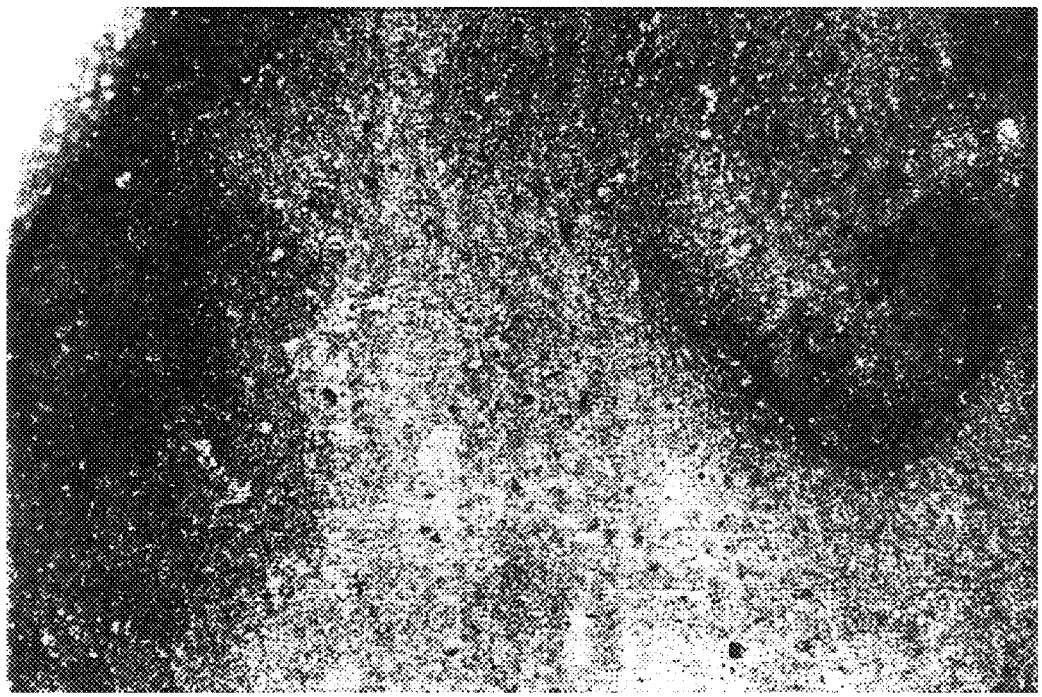
FIG. 2 is a caseinate-free batter-coated chicken piece prepared as described in Example 3.

Close-up photographs were then taken and are attached as FIGS. 1 and 2, which correspond respectively to the sodium caseinate-containing batter-coated chicken pieces and to the caseinate-free batter-coated chicken pieces. These photographs demonstrate the crisp, crunchy, fracturable coating and golden brown appearance achieved in the caseinate-containing product and the far less desirable appearance and texture achieved in the caseinate-free product.

Example 4

Storage under a heat lamp was examined in this example.

Marinated, bone-in chicken pieces were coated with a 4-pass system (batter-breading-batter-breading), par-fried and individually quick-frozen. The hydrated batter contained 33.2% modified food starch, 1.8% sodium caseinate, and 65% water. The batter delivered approximately 0.5% sodium caseinate to the final product.

The battered and breaded frozen chicken was reconstituted in an open fryer and fully cooked. The product was then held under a heat lamp where it was observed to remain very crispy throughout the two hour holding period. Similar products made with a traditional sodium caseinate-free coating system and held under a heat lamp were found to lose crispness after approximately 30 minutes.

Example 5

This example demonstrates the creaming of 8% by weight vegetable fat onto 92% by weight wheat flour.

The wheat flour was added to the shortening and the mixture is mixed for 2 minutes at high speed in a Littleford Blender model FM130, used to cream the shortening for one minute at high speed (3 cubic feet@155 rpm). The resulting product was used in a batter prepared in accordance with the invention. The viscosity of the batter was significantly reduced from that obtained with the same batter in which the fat was not creamed onto the flour, but rather was added separately.

Example 6

A study was performed to determine the effect of the combination of egg white and sodium caseinate on the textural characteristics of battered foods. The data obtained was as follows:

| Effect of Egg White on Tempura Coating Texture in the Presence of Sodium Caseinate | |
|---|---|
| Control Formula: | |
| Yellow Corn Flour | 32 |
| Wheat Flour | 32 |
| Unmodified Corn Starch | 32 |
| Flavors and Seasoning | 4 |
| | texture |
| Test Variables (Batter Solids: 47.62%–48.08%): | sensory |
| 1. Control fish batter | Slightly crisp |
| 2. With 0.3% sodium caseinate | Crisp |
| 3. With 0.3% sodium caseinate and 0.3% egg white (1:1 ratio) | Slightly tough |
| 4. With 0.3% sodium caseinate and 0.6% egg white (1:2 ratio) | Tough |
| 5. With 0.3% sodium caseinate and 0.9% egg white (1:3 ratio) | Tough-leathery |

The results of the test indicate that there is a strong correlation between the lack of texture enhancement as the level of egg white is increased within the formula. The best product, in terms of textural enhancement; i.e., crispiness, was the product with sodium caseinate without egg white.

While the present invention is described above in connection with preferred or illustrative embodiments, these embodiments are not intended to be exhaustive or limiting of the invention. Rather, the invention is intended to cover all alternatives, modifications and equivalents included within its spirit and scope, as defined by the appended claims.

What is claimed is:

1. A food product comprising:
   a food substrate; and
   a cereal-based hydrated batter containing dry ingredients, water and sodium caseinate, coated on the food substrate, said hydrated batter having a total solids level of at least about 30 percent by weight and being picked up on the substrate at a level sufficient to provide at least about 0.2 percent by weight of the sodium caseinate based on the weight of the coated product, said hydrated batter also being free of egg albumen and whey and having added edible fat at a level of about 2–4% by weight.

2. The food product of claim 1 including a breading coated onto the batter as an overcoat, as an undercoat, or as an undercoat and as an overcoat.

3. The food product of claim 1 in which the food substrate is chosen from the group consisting of meat, poultry, seafood, cheese, vegetables, fruit, cereal-based products and nuts.

4. The food product of claim 3 in which the cereal-based products include pizza doughs, biscuit doughs, grain-based snacks, veggie burgers, and breakfast cereals.

5. The food product of claim 1 in which the hydrated batter is a tempura batter.

6. The food product of claim 1 in which the dry ingredients comprise about 15–76 percent by weight wheat flour, about 0–60 percent by weight yellow corn flour, about 0–75 percent by weight modified and/or unmodified food starch, about 0–15 percent by weight salt, about 0–20 percent by weight sugars, and about 0.25 percent by weight leavening, with the dry ingredients being combined with water in a ratio by weight of water to the dry ingredients of from about 2:1 to 1:1.25.

7. The food product of claim 1 in which the dry ingredients comprise about 0–20 percent by weight yellow corn flour, about 10–90 percent by weight modified and/or unmodified food starch, about 0–20 percent by weight wheat flour, about 2–10 percent by weight salt, about 0–5 percent by weight sugars, and about 0–1 percent by weight leavening, with the dry ingredients being combined with water in a ratio by weight of water to the dry ingredients of from about 2:1 to 1:1.

8. The food product of claim 2 in which the breading is an unhydrated, raw, fully-cooked or partially-cooked cereal.

9. The food product of claim 2 in which the breading is chosen from the group consisting of wheat flour, rice flour, corn flour, bread crumbs and cornflakes.

10. The food product of claim 1 in which the level of sodium caseinate in the hydrated batter ranges from about 0.6 to 8.0 percent by weight.

11. The food product of claim 1 in which the level of sodium caseinate in the hydrated batter is about 3 percent.

12. The food product of claim 1 in which the pick-up of the hydrated batter on the food substrate is sufficient to provide about 0.2 to 3.0 percent by weight of sodium caseinate based on the weight of the coated product.

13. The food product of claim 1 including in the hydrated batter at least about 2 percent by weight of added edible fat based on the weight of the hydrated batter.

14. The food product of claim 1 including in the hydrated batter about 3 percent by weight of added edible fat based on the weight of the hydrated batter.

15. The food product of claim 1 in which the added edible fat is creamed onto some or all of the dry ingredients.

16. A method of preparing a food product comprising:
   coating a food substrate with a hydrated batter containing sodium caseinate and no egg albumen and whey in which the hydrated batter has a total solids level of at least about 30 percent by weight and provides at least about 0.2 percent by weight of sodium caseinate based on the weight of the coated product, said hydrated batter having added edible fat at a level of about 2–4% by weight;
   parfrying the coated product; and
   fully cooking the parfried and coated product.

17. A method of preparing a food product comprising:
   batter-coating a food substrate with a hydrated batter containing sodium caseinate and not egg albumen and whey in which the hydrated batter has a total solids level of at least about 30 percent by weight and provides at least about 0.2 percent by weight of sodium caseinate based on the weight of the coated product, said hydrated batter having added edible fat at a level of about 2–4% by weight;
   applying breading to the food substrate;
   fully cooking the coated product; and
   re-heating the coated product.

18. The method of claim 16 in which a breading is applied to the food substrate.

19. The method of claim 17 in which the batter-coated substrate is frozen or refrigerated before fully cooking.

* * * * *